May 19, 1964

E. FRISCH 3,133,867

NEUTRONIC REACTOR FUEL ELEMENT

Filed March 17, 1958

INVENTOR
Erling Frisch
BY
Donald J Smith
ATTORNEY

May 19, 1964 E. FRISCH 3,133,867
NEUTRONIC REACTOR FUEL ELEMENT
Filed March 17, 1958 4 Sheets-Sheet 2

May 19, 1964 E. FRISCH 3,133,867
NEUTRONIC REACTOR FUEL ELEMENT
Filed March 17, 1958 4 Sheets-Sheet 3

May 19, 1964  E. FRISCH  3,133,867
NEUTRONIC REACTOR FUEL ELEMENT
Filed March 17, 1958  4 Sheets-Sheet 4

United States Patent Office 3,133,867
Patented May 19, 1964

3,133,867
NEUTRONIC REACTOR FUEL ELEMENT
Erling Frisch, Pittsburgh, Pa., assignor, by mesne assignments, to the United States of America as represented by the United States Atomic Energy Commission
Filed Mar. 17, 1958, Ser. No. 721,775
7 Claims. (Cl. 176—78)

The present invention relates to a fuel element assembly for neutronic reactors and, more particularly, to a fuel element assembly adapted for use in a pressurized water heterogeneous type reactor.

The fuel element assembly disclosed herein is adapted for use in a neutronic reactor wherein a quantity of one or more of the fissionable isotopes $U^{233}$, $U^{235}$ and $PU^{239}$ is caused to undergo a chain reaction. The chain reaction is propagated by neutrons having a specific range of velocities depending upon the type of reactor in which the fissionable material is employed.

In a thermal-type reactor the chain reaction is propagated by neutrons having velocities equivalent to thermally excited hydrogen ions or about 2500 meters per second. A neutronic reactor of this character usually employs the $U^{233}$ or $U^{235}$ isotopes or both of uranium to propagate the reaction. However, during the fissioning of each of these atoms, which, of course, results in two approximately equal fission fragments, an average of approximately three neutrons are expelled. However, most of these neutrons have velocities in the fast region or velocities exceeding 10,000 meters per second. Therefore, in order to propagate the chain reaction in a thermal reactor, it is necessary to employ a neutron-slowing material, termed a moderator, to slow the fast neutrons to the thermal velocity region. Suitable moderator materials are carbon, hydrogen, and deuterium, or materials containing these elements such as graphite, light water, deuterium oxide or heavy water, and radiation-stable organic materials, such as the multi-phenyls.

The thermal type reactor may be constructed in the form of a lattice network of uranium or an alloy thereof containing one of the fissionable isotopes and provided with coolant passages for the circulation of a suitable cooling medium such as water or carbon dioxide. Alternatively, the nuclear fuel material can be suspended in spaced relation in a pressurized vessel and light or heavy water can be utilized both as a cooling medium and as a moderator material, with suitable circulating loops being employed to maintain a flow of the moderator-coolant through the vessel to remove the heat developed by the chain reaction. Suitable heat exchanging means are disposed in the aforementioned circulating loops in order to convert into steam the water supplied to the heat exchanger from one or more secondary or thermodynamic loops.

As stated previously, the aforementioned coolant-moderator in certain applications, can be either light or heavy water with light water being the more efficient moderator material due to the lighter weight of the hydrogen nuclei. On the other hand, the use of heavy water is applicable in those cases wherein it is necessary to minimize the parasitic absorption of fissional neutrons within the reactor system as a result of peripheral and structural neutron losses. Heavy water is advantageous in this application in that it has a much smaller neutronic capture cross-section than light water.

The peripheral loss of neutrons from the chain reacting system is minimized by providing a neutronic reflector adjacent the periphery of the system or adjacent the inner walls of the containment vessel. This reflector can take the form of a layer of graphite disposed adjacent the walls of the vessel or of a water chamber or annular space usually reserved for this purpose between the outer periphery of the reactor core structure and the inner walls of the reactor vessel. When light or heavy water is employed as a coolant, this annular space, of course, is filled with the water and thus serves as a neutronic shield or reflector.

Another form of neutronic reactor is typified by the so-called epithermal reactor. In this reactor a quantity of at least one of the aforementioned fissionable isotopes are subjected to a chain reaction maintained by neutrons within the epithermal region, that is to say, neutrons having velocities between 2500 and 10,000 meters per second. In this form of reactor, the nuclear fuel or fissionable material is relatively closely spaced in order to lessen the moderating capacity of the moderator material. This form of reactor is particularly applicable for the fissioning of plutonium 239 which is fissionable only by neutrons in the higher velocity ranges.

The thermal- or epithermal-type reactors are controlled by means of so-called control rods which are insertable through the reactor vessel into the reactor core. These control rods each contain a relatively good neutron-absorbing material, such as boron, hafnium, and gadolinium, and by variably absorbing the neutrons produced by the chain reaction, depending upon the position of the control rods relative to the reactor core, the propagation of the chain reaction to the reactor core, can be carefully controlled.

In any of the aforementioned basic reactor concepts, a fertile or "blanket" material such as uranium 238 or thorium 232, can be mixed or intermingled with the previously mentioned fissionable materials or otherwise disposed within the reactor vessel at positions adjacent to the fissionable isotope. The fertile materials, when thus used, absorb those neutrons which are not required for the propagation of the chain reaction and in doing so are transmuted into certain ones of the fissionable isotopes. For example, during neutronic radiation, atoms of the fertile material uranium 238 when employed are converted into the fissionable transuranic element plutonium 239 in accordance with the following nuclear equations:

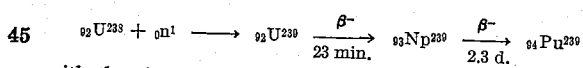

with the times denoted in connection with the latter two reactions being the half-lives of the decaying isotopes. The plutonium 239 isotope is produced in either the thermal reactor wherein the initial core loading consists of natural or source-grade uranium, which may be enriched with one of the aforementioned fissionable isotopes or disposed adjacent to a quantity of the fissionable isotope in the form of a "seed"; or in the fast breeder type reactor wherein the initial core loading consists of natural uranium and a quantity of the plutonium 239 isotope.

On the other hand, the artificial fissionable isotope $U^{233}$ is obtained when thorium 232 is employed as the fertile or blanket material in a thermal or epithermal type reactor. The $U^{233}$ isotope is formed as a result of the following series of nuclear reactions:

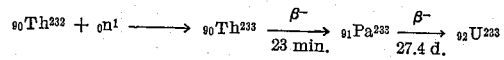

The artificial fissionable isotope $U^{233}$ and the transuranic isotope $Pu^{239}$ have half-lives of 163,000 years and 24,000 years, respectively, and therefore are relatively stable in this respect.

The neutronic reactor reaches criticality when each succeeding generation of fissions of the chain reaction is exactly equal in number to that of the preceding generation. At this point the effective constant of criticality ($K_{eff.}$)

is equal to unity and as a result, of the average of three neutrons yielded in each fission, only approximately one of these neutrons is employed to propagate the chain reaction, and the remainder of the neutrons are absorbed by the aforementioned fertile materials by the moderator and coolant materials and by the structural components of the reactor system.

Control of neutronic reactors is made feasible by the phenomenon of delayed neutrons. It has been found that an average of about 2.8 to 2.9 of the 3.0 fission neutrons are emitted immediately upon fissioning of each chain-reacting atom. The delayed neutrons are emitted up to about 12 minutes after the fission process. Although only about 3 to 7% of the total neutrons emitted as a result of atomic fission are delayed neutrons, the time-margin provided by these delayed neutrons is sufficient to permit adjustment of the control rods to maintain the chain reaction approximately at the point of criticality during operation of the reactor. Otherwise, a tendency to an increase in the number of fissions from one generation to the next in the chain reaction would be multiplied almost instantaneously.

A more detailed description of the theory and operation of neutronic reactors are given in Patents Nos. 2,708,656 and 2,798,847, issued May 17, 1955, and July 9, 1957, to Enrico Fermi and Leo Szilard, and entitled "Neutronic Reactor" and "Method of Operating a Neutronic Reactor," respectively.

In order to protect the fissionable material from the corrosive effects of the high temperature pressurized water utilized in the coolant system for neutronic reactors of the character described herein, it is necessary to encase the fissionable isotope within a suitable corrosion-resistant material. Because of the considerable length of the fuel rods employed within the reactor core, the casing material and associated structural components have heretofore been made in relatively large size or thicknesses in order to support properly the fuel elements. In many cases, the required mass of structural material increased the importance of utilizing material having a low neutronic absorption cross section.

The fuel rods employed in present or proposed pressurized water reactors and similar heterogeneous type reactors frequently are provided with a total length in the order of 9 feet and with an outside diameter in the order of 0.3 inch. The slenderness of the fuel rods has greatly magnified the problem of providing adequate support necessary to prevent the closely spaced and elongated fuel rods from bending or sagging and thereby restricting the coolant passages therebetween. Heretofore, it has been proposed to furnish the fuel rod assemblies in the form of tandemly-connected subassemblies of fuel rod segments and to support these segments by an arrangement of end plates and tie rods, or the like.

In these prior arrangements, the employment of the tandemly-connected subassemblies and the accompanying structural components increases greatly the quantity of structural materials associated with the reactor fuel and, thus, has made imperative the selection of those structural materials having low neutronic absorption cross-sections. In some respects, zirconium or one of its alloys is an ideal material for this purpose, because of its low neutronic absorption cross-section and its high corrosion-resistance to water at the customary operating temperatures of pressurized water reactors. On the other hand, the cost of the zirconium material is rendered exorbitant because of the initial high cost thereof and because of the difficulty in working the material into fuel rod casings or tubing and other structural components of the fuel assembly. Another disadvantageous aspect of utilizing a zirconium base material results from the fact that welding of this material must be performed in an inert atmosphere and that special precautions must be undertaken to avoid zirconium fires whenever working with this material.

It is therefore advantageous, in an effort to lower the cost of producing reactor cores, to utilize less expensive and non-hazardous materials, such as stainless steels, for the structural members of the core. Stainless steels have excellent corrosion-resistant properties and are easier and less expensive to handle and to form into the desired shapes, but have a higher absorption cross-section than zirconium-base materials. Because of this higher cross-section, it is imperative that the amount of stainless steel structural materials in the core be reduced to a minimum, for otherwise the uranium inventory and the size of the core must be increased to a point at which the economic advantage stemming from employment of stainless steels is lost. For these reasons the prior proposed methods of assembling fuel rods by means of a series of tandemly connected end plate and fuel element bundles are unsatisfactory.

In another prior fuel element assembly, the fuel bearing portion thereof comprised continuous fuel rods which extended substantially the entire length of the assembly. These rods were joined laterally to one another through the use of a number of short tubular members which did not interrupt appreciably the flow passages between adjacent fuel rods. On the other hand, a relatively large number of fuel rods comprising one of the four or more subassemblies of the fuel element assembly, had to be joined simultaneously in a suitable brazing furnace. The lateral joining of such a large number of rods at one time not only made the subassembly difficult to inspect for defective joints between the tubular members and the adjacent fuel elements and for ruptured or otherwise defective fuel rods, but in addition, resulted in the rejection of a relatively large number of fuel rods in the event that one of the fuel rods were damaged during brazing.

Accordingly, an object of the present invention is to increase the efficiency of and to reduce the cost of a fuel element assembly of the character described.

Another object of the invention is to furnish an improved method and arrangement for forming and supporting the fuel rods of the assembly. More specifically, it is an object of the invention to reduce the thickness of the casing of the individual fuel rods and to minimize the number of structural components associated with the fuel rod assembly.

Further objects of the invention are to facilitate the passage of coolant flowing between the fuel rods of the assembly and to minimize the spacing required for adequate coolant flow therebetween.

Still another object of the invention is to reduce the complexity of a reactor fuel assembly and to minimize the constructional time required in the fabrication of the individual fuel rods and of the assembly formed therefrom.

A further object of the invention is to obviate sagging or bending of the individual fuel rods in the assembly, under the influence of the weight thereof or of the heat developed within the reactor core or of vibrational energies induced by the necessarily high volume of coolant flow.

A still further object of the invention is to provide a fuel element assembly for a neutronic reactor having novel means for joining the individual fuel rods thereof laterally to one another.

More specifically, it is an object of the invention to provide a fuel element assembly in which the aforementioned lateral joining means can be effected with simple welding techniques and in which the welds so produced can be easily inspected before final assembly of the fuel element assembly.

Still another object of the invention is to provide a fuel element assembly for a neutronic reactor wherein the individual rods thereof are joined laterally by novel means and wherein relatively few fuel rods are welded to each member of the joining means, with the result that damage of a fuel rod during assembly will result in the rejection of only a relatively few fuel rods.

The aforementioned and additional objects, features and advantages of the invention will be made apparent during the ensuing description of exemplary forms thereof, with the description being taken in connection with the accompanying drawings, wherein.

Figure 3:
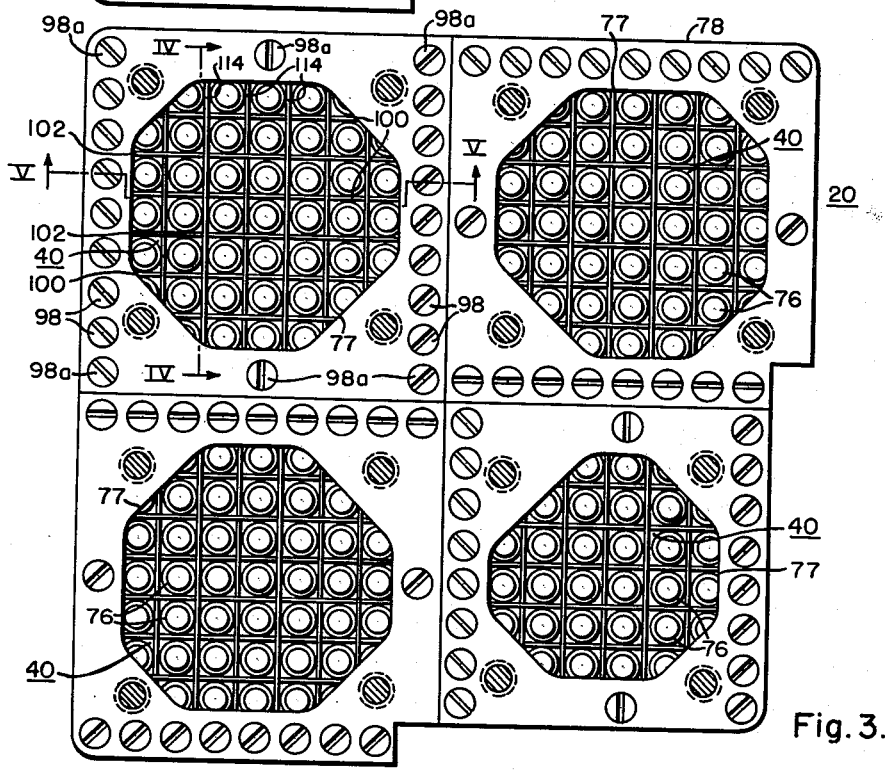
FIG. 3 is a cross-sectional view of the fuel element assembly shown in FIG. 1 and taken along reference lines III—III thereof.
Figure 4:
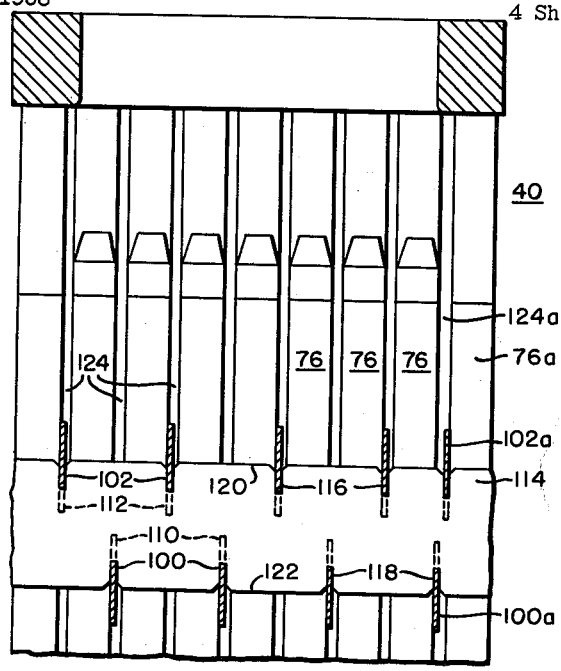

FIG. 4 of the drawings is a partial longitudinal sectional view of the fuel element assembly illustrated in FIG. 3 and taken along reference lines IV—IV thereof.

Figure 5:
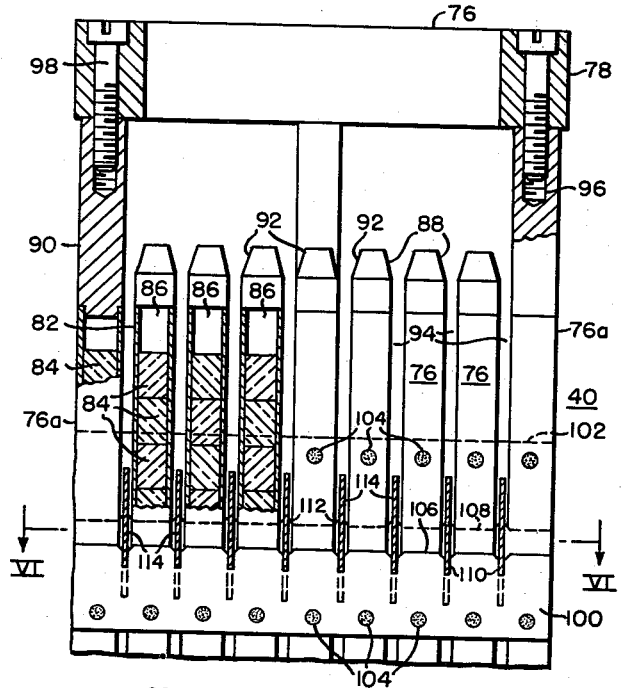

FIG. 5 is another partial longitudinal sectional view of the fuel element assembly depicted in FIG. 3 of the drawings, but taken along reference lines V—V thereof.

Figure 6:
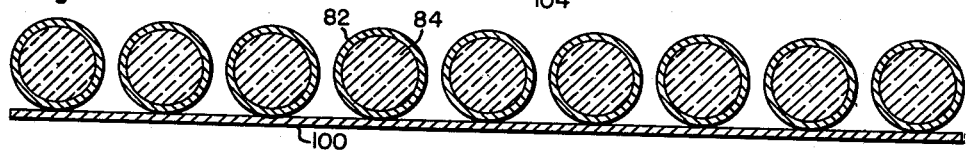

FIG. 6 is a cross-sectional view of that row of fuel rods illustrated in FIG. 5 of the drawings and taken along reference lines VI—VI thereof.

Figure 1:
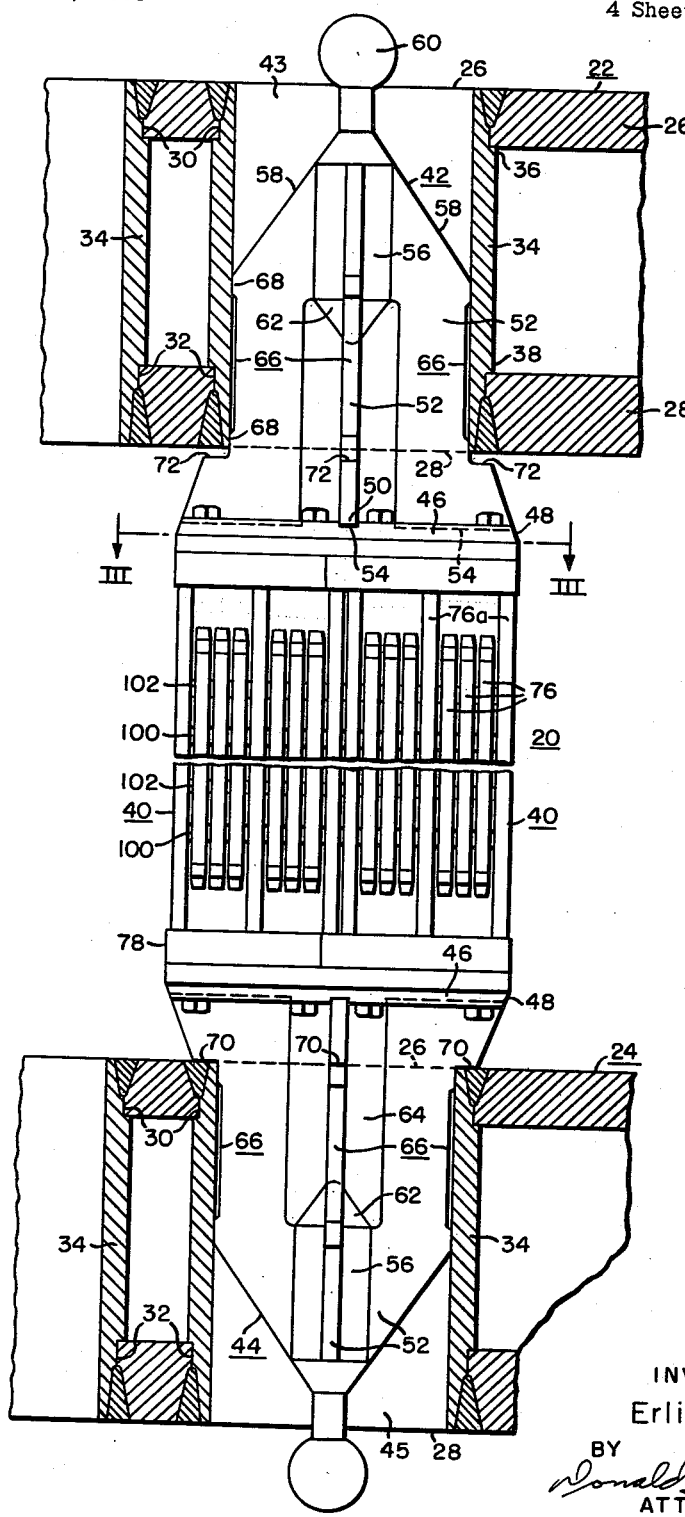
FIGURE 1 is a partial vertical section taken through a neutronic reactor core and showing in elevation the fuel element assembly of the invention.
Figure 7:
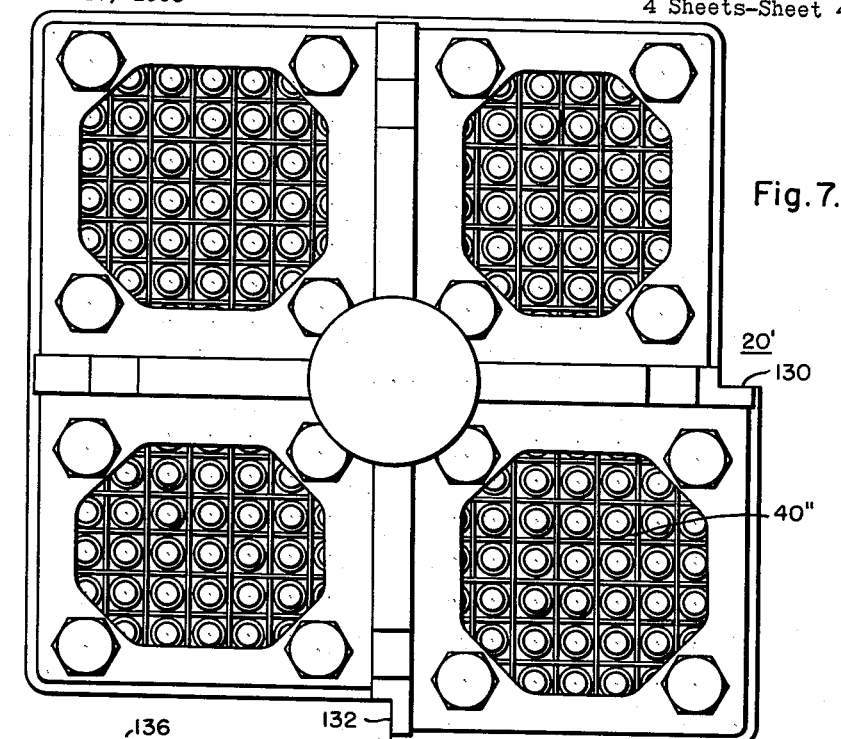
Figure 8:
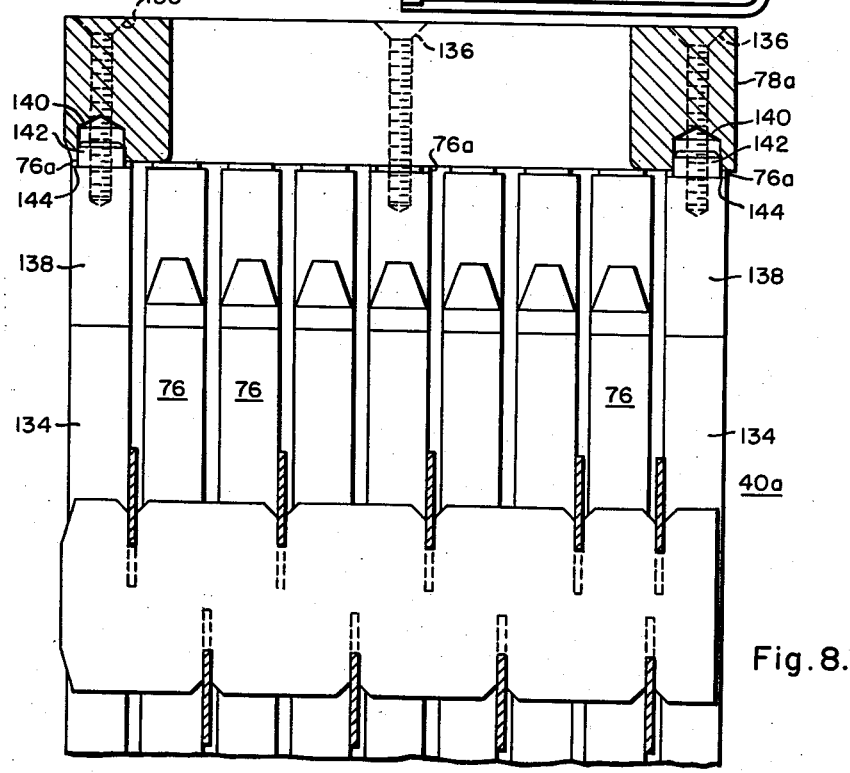

FIG. 7 is a top plan view of a modified form of the fuel element assembly illustrated in FIG. 1 of the drawings and provided with a complementary configuration which, in conjunction with the fuel element of FIG. 1, will permit insertion of a cruciform type control rod therebetween, and FIG. 8 of the drawings is a partial longitudinally sectional view of the fuel element assembly arranged according to the invention and having a modified form of end-joining means.

The fuel element assembly disclosed and claimed herein is adapted for use with a neutronic reactor such as that described in detail in a paper entitled "Description of the Pressurized Water Reactor (PWR) Completed Power Plant at Shippingport, Pa.," by J. W. Simpson et al., A/Conf. 8/P/815, published by the United Nations as part of the "Geneva Papers." More particularly, the aforesaid fuel element assembly is adapted for use in the neutronic reactor described in a paper entitled "The Yankee Atomic Electric Plant," by Glenn A. Reed, Robert J. Creagan and Walter C. Woodmen, published at the A.S.M.E. annular meeting, New York City, November 26 to 30, 1956. The last-mentioned neutronic reactor is also described in a now abandoned copending application of Robert J. Creagan entitled "Neutronic Reactor," Serial No. 686,778, filed September 27, 1957, and assigned to the assignee of the present application. Some of the reactor parameters of the last-mentioned reactor are amplified in a copending application of R. K. McGeary et al. entitled "Fuel Element for a Neutronic Reactor," Serial No. 721,776 filed March 17, 1958, likewise assigned to the present assignee, and now U.S. Patent 3,100,742. The over-all configuration of the fuel element assembly forming the subject of the present invention is substantially similar to that described in the aforementioned A.S.M.E. publication, with the exception that the fuel element assembly is provided with improved and novel lateral end joining means.

Figure 2:
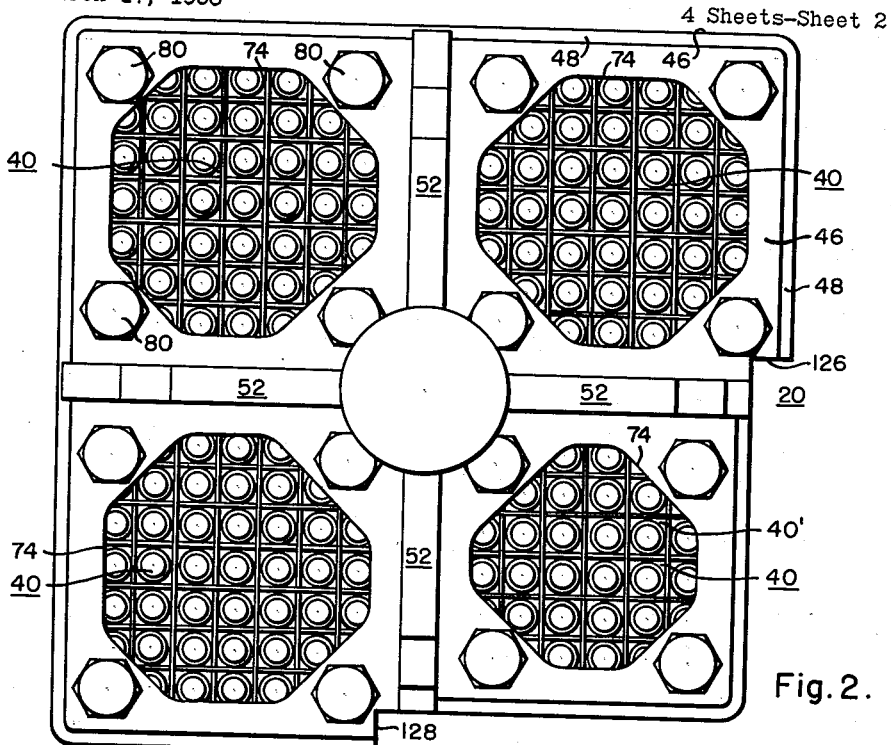
FIG. 2 is a top plan view of the fuel element assembly illustrated in FIG. 1 of the drawings.

Referring now more particularly to FIGS. 1 to 3 of the drawings, the reactor fuel element assembly 20 of the invention is arranged for suspension between upper and lower reactor core supporting plate assemblies 22 and 24, respectively. As described in the aforementioned copending application, the core supporting plates 22 and 24 are joined by a cylindrical barrel (not shown). Each of the supporting plates 22 or 24 includes a pair of spaced discs 26 and 28 both of which are provided with a plurality of aligned apertures 30 and 32, respectively. A tubular member 34 is inserted through each pair of apertures 30 and 32 to provide flow channels for each fuel element assembly 20. In addition, the tubular members are provided with annular shoulders 36 and 38 disposed adjacent their ends for the purpose of maintaining the spacing between the discs 26 and 28 of each core supporting plate 22 or 24. In this form of neutronic reactor, the upper and lower supporting plate assemblies 22 or 24 are fabricated from stainless steel, as are the structural components of the fuel element assembly 20, in order to minimize corrosion by the high temperature reactor coolant. In the typical neutronic reactors described in the aforesaid copending application and in the Geneva or A.S.M.E. publication, the reactor coolant is light water ($H_2O$), which serves in addition as a neutronic moderator for the nuclear fuel material.

In one exemplary arrangement of the invention, the fuel element assembly 20 comprises four fuel rod subassemblies 40 which are joined laterally by means presently to be described. The subassemblies 40 are coupled at their ends, respectively, to a pair of end pieces 42 and 44 in tandem relationship. The end pieces 42 and 44 are inserted, respectively, into oppositely disposed flow apertures 43 and 45 formed by the tubular members 34 of the upper and lower plate assemblies 22 and 24, respectively.

Each of the end pieces 42 and 44 in this arrangement comprises a base plate 46 having an approximately square outer periphery. Additionally, the outer edges of the base plate are chamfered, as indicated by the reference character 48, in order to facilitate insertion and withdrawal of the fuel assembly 20 relative to other fuel assemblies of the reactor core when the upper core supporting plate 22 has been removed. Joined to the base plate 46 are a plurality of flat spacing struts 52, with the inward edges 54 of the struts 52 being inserted into suitable grooves formed in the outer surface of the base plate 46. When thus inserted, the spacing struts 52 are then welded to the base plate 46 in a conventional manner. In this example, four such struts 52 are employed and when secured to the base plate 56 are disposed substantially at right angles thereto and to one another.

At their other ends, the struts 52 are joined as by welding to a central cylindrical supporting hub 56, and the outward edges 58 of the struts 52 are tapered rather steeply to facilitate insertion of the end pieces within the associated tubular members 34 of the reactor core supporting plates 22 and 24. The outward end of the central supporting hub 56 terminates in a spherical projection 60 furnished for the purpose of facilitating grappling of the fuel element assembly 20 with a suitable long-handled or remotely operated tool (not shown). One form of suitable grappling tool is described in a now abandoned copending application of the present inventor entitled "Nuclear Reactor," filed September 19, 1956, Serial No. 610,821, and assigned to the present assignee. The other end of the cylindrical supporting hub 56 terminates in a conical section 62 in order to minimize induced fluid friction within the reactor coolant flowing through the tubular members 34 of the upper and lower core supporting plates 22 and 24.

Desirably, the outer edges 66 of the spacing struts 52 are machined so that these outer edges fit relatively closely with the inner surface of the tubular members 34. The aforesaid machining is controlled in addition so that when so fitted the spacing struts 52 maintain the fuel element assembly 20 centrally of the opposed tubular members 34 of the core supporting plates 22 and 24. Thus, by suitable spacing of the tubular members 34 in each of the core supporting plate assemblies 22 and 24, the distance between adjacent fuel element assemblies 20 can be carefully controlled. In furtherance of this purpose, each of the lateral edges 66 is provided with a pair of projections 68 which actually engage the inner surface of the tubular members 34. Accordingly, accurate machining of the entire intermedate lengths of the lateral edges 66 can be avoided.

The lower end piece 44 is provided with shoulders 70 disposed one on each of the spacing struts 52 thereof which serve to position the end piece and the remainder of the fuel element assembly 20 relative to the lower core plate 24. Similar shoulders 72 are provided on the upper end piece 42 so that the fuel element assembly is made symmetrical, that is to say, so that either end piece 42 or 44 can be inserted into the lower plate assembly 24. The length of the fuel element assembly is such, however, that the shoulders 72 of the upper end piece 42 terminate a short distance below the upper supporting plate 22 to permit thermal expansion of the fuel element assembly 22 relative to the aforementioned reactor core.

Inwardly of the supporting hubs 56, the four spacing struts 52 of each end piece 42 or 44 define openings 64 in order to facilitate flow of the reactor moderator-coolant to all portions of the base plates 46. From the spacing struts 52 and the tubular members 34, the coolant flows through a plurality of flow apertures 74 which are formed, as better shown in FIG. 2 of the drawings, in the base plates 46. The apertures 74, being four in number in this arrangement, are disposed respectively adjacent the ends of the fuel rods 76 of each subassembly 40. The apertures 74 of each base plate 46 are aligned respectively with apertures 77 of similar contour formed in associated end plates 78. Each base plate 46 is secured to the adjacent end plates 78 by means of a plurality of cap screws 80, and each of the latter plates 78 is, in turn, secured to a plurality of longer fuel rods 76a extending from each subassembly 40. The purpose of the flow apertures 74 and 77 of the base plates 46 and end plates 78, respectively, is to facilitate the flow of coolant fluid relative to the end pieces 42 and 44 and longitudinally of the individual fuel rods 76 and 76a of the fuel element assembly 20 in order to remove heat evolved from the chain reaction when sustained in a plurality of these fuel element assemblies.

As stated heretofore, each of the subassemblies 40 includes a plurality of fuel rods 76 and 76a. As described in a now abandoned copending application of Erling Frisch, entitled "Fuel Element Assembly for Nuclear Reactor," filed January 23, 1957, Serial No. 635,911, and assigned to the present assignee, each of the fuel rods or elements 76 comprises an elongated cladding tube 82 in which a plurality of ceramic pellets or cylinders 84 are inserted in contiguous tandem relation. The cylinders 84 are made relatively short for ease in handling and manufacturing and in this arrangement are formed from uranium oxide, for example $UO_2$. The pellets 84 extend substantially along the length of the cladding tube 82 with a space 86 being left at the top of the cladding tube to allow for expansion of the pellets relative to the cladding tube. At each end of each of the cladding tubes 82, and end plug 88 or 90 is inserted and hermetically sealed to the cladding tube 82 as by welding. The shorter end plugs 88 are tapered at their outer ends as denoted by the reference character 92, in order to reduce the resistance thereof to coolant flowing through the aligned apertures 74 and 77.

The longer end plugs 90 which are inserted into the ends of each of the fuel rods 76a are provided with such length that the ends of the fuel rods 76 will be spaced a sufficient distance from the end plates 78, respectively, so that the incoming coolant fluid will be distributed as evenly as possible among the coolant passages 94 formed between adjacent fuel rods 76. The elongated end plugs 90 serve the additional function of securing each fuel rod subassembly 40 to its end plates 78, respectively. This latter function is exemplified by providing tapped apertures 96 in the outward ends of the elongated plugs 90 into which apertures 96 cap screws 98 are threaded after first having been inserted through suitable apertures of the respective end plates 78. However, before the elongated end plugs 90 of the fuel rods 76a are fastened to the end plates 78, the fuel rods 76 and 76a are joined laterally in accordance with the invention and in such fashion that the resistance to fluid flow through the assembly of fuel rods 20 is not substantially restricted.

One form of the aforementioned lateral joining means will now be described in detail with reference to FIGS. 3 to 6 of the drawings. In this arrangement of the invention, each subassembly 40 comprises approximately 81 fuel rods arranged into a substantially square configuration of nine rows of nine rods each. It will be apparent, however, that a greater or lesser number of fuel rods can be utilized in keeping with the invention.

In an exemplary form of the invention, adjacent rows of the fuel rods 76 are welded respectively to relatively thin straps 100 and 102, respectively. The rods 76 are secured desirably to the straps 100 or 102 by means of spot welding, for example, as denoted by reference characters 104. Alternatively, the straps 100 and 102 and rods 76 can be secured by means of furnace brazing in a well-known manner. The opposing lateral edges 106 and 108 of the straps 100 and 102 are provided with generally vertically extending notches 110 and 112, respectively. Each group of notches 110 and 112 are arranged to fall generally between adjacent fuel rods 76 and the first group of notches 110 extending from the upper edge 106 of the strap 100 while the second group of slots 112 extend upwardly from the lower edge 108 of the strap 102. The straps 100 and 102 are made relatively thin and are longitudinally displaced in adjacent rows in order that the flow passages between the fuel rods 76 will not be restricted substantially.

It will thus be seen that a group of only approximately nine of the fuel rods 76 are welded in this arrangement to a single strap or structural member 100 or 102. Accordingly, should any damage result to any one of the fuel rods 76, in the aforesaid group, it is necessary to discard or reject only about nine fuel rods. On the other hand, previous fuel element assembly designs frequently require welding or brazing at one time the entire group of fuel rods comprising the subassembly 40. These prior arrangements suffer from the disadvantages, then, that the inwardly disposed fuel rods are difficult to inspect and that rupture or other damage to one of the fuel rods would necessitate elimination of the entire subassembly 40. Moreover, by employing lateral spacing and joining means utilizing spot welds 104, the fuel rod cladding or jacket 82 is not subjected to excessive heat during the welding process. Therefore, in the case of stainless steel cladding tubes 82, the cold-drawn strength thereof is not reduced by subsequent heating of the fuel rods which otherwise frequently occurs in prior fuel rod arrangements.

The groups of straps 100 and 102 and consequently the rows of fuel rods 76 welded thereto are joined by a plurality of divider straps 114, which likewise are inserted between adjacent rows of fuel rods 76 but at right angles to the welded straps 100 and 102, as better shown in FIG. 3 of the drawings. Each divider strap 114 is provided with a series of spaced notches 116 and 118 extending inwardly from the lateral edges 120 and 122, respectively, of the divider strap. The walls of the notches 116 and 118 are tapered adjacent lateral edges 120 and 122 of the divider straps 114 in order to facilitate insertion of the welded straps 102 and 100, respectively, therein at the slots of the latter; in furtherance of this purpose, the walls of the slots 110 and 112 of the welded straps 100 and 102 similarly are tapered. When thus inserted, the notches 116 and 118 of the divider straps 114 cooperate respectively, with slots 110 of the welded straps 100 and with slots 112 of the welded straps 102.

The notches 116 and 118 of the divider straps 114 are disposed generally between adjacent rows of the fuel rods 76, but are somewhat closer to that row of fuel rods which are secured to each one of the welded straps 102 or 100, which are inserted as aforesaid into the slots 116 and 118. In this manner, a uniform spacing is maintained between adjacent rows of the fuel rods 76, both in the direction of the welded straps 100 and 102 as shown in FIG. 5, and in the direction of the divider straps 114, as shown in FIG. 4. With the exception of flow channel 124a at the extreme right of the subassembly 40 of FIG. 4, the welded straps 100 and 102 are disposed respectively in alternate ones of the flow channels 124 so that two of the welded straps 100 and 102 for the most part are not disposed in the same flow channel. The welded strap 102a, however, is placed in the flow channel 124a with the welded strap 100a in order to avoid the use structural members at the outer periphery of the fuel rod subassembly 40.

Although it is contemplated that the welded straps 102 and 100 can be spot welded or brazed to the divider strap 114 as each of the straps 102 and 100 are frictionally engaged therewith, it is believed to be desirable, however, to omit the last-mentioned spot welding step in order that fuel element subassembly can be readily disassembled to remove one or more rows of the fuel rods 76 therefrom in the event that one or more of the fuel rods are damaged during fabrication or operation of the fuel element assembly 20. In the latter case, frictional engagement between the welded straps 100 and 102 and the divider straps 114 is maintained inasmuch as each row of fuel rods which are secured to the welded straps 100 or 102 contains at least two of the relatively longer fuel rods 76a. As described heretofore, the longer fuel rods 76a are secured at their ends respectively directly to the end plates 78. Accordingly, relative longitudinal movement between the welded straps 100 and 102 and the rows of fuel rods 76 secured to each of these straps is positively prevented. The end plates 78 in addition serve to join the four subassemblies 40 to the end pieces 42 and 44 to complete the fuel element assembly 20.

As shown in FIGS. 4 and 5 of the drawings, the lateral joining means comprising the welding straps 100 and 102 and the wider straps 114 may be employed at spaced positions along the length of the fuel rod subassembly 40 to lend stability to the subassembly and to prevent sagging of the individual fuel rods thereof during operation of the neutronic reactor.

Referring now to FIGS. 2 and 7 of the drawings, it will be seen that the fuel element assembly 20 of FIG. 2 is provided with offset portions 126 and 128. On the other hand, the modified fuel element assembly 20' of FIG. 7 is furnished at substantially similar locations with projecting portions 130 and 132. The offset portions 126 and 128 are provided by omitting an outer row of fuel rods from adjacent outer sides of the fuel element subassembly 40' of FIG. 2. On the other hand, the projecting surfaces 130 and 132 of the modified assembly 20' (FIG. 7) result from having added rows of fuel rods to similar locations of the fuel rod subassembly 40". As shown and described in the aforementioned copending application of Robert J. Creagan, these offset portions 126 and 128 and the projecting portions 130 and 132 cooperate to afford cruciform channels for the insertion of complementarily shaped control rods likewise described in the aforesaid application of Robert J. Creagan.

Referring now to FIG. 8 of the drawings, an alternative end joining means for engaging some of the relatively longer fuel rods 134 to the end plates 78a is illustrated therein. The subassembly 40a of FIG. 8 is substantially similar to the subassembly 40 described heretofore and the partial longitudinal sectional view of FIG. 8 is taken generally along the reference lines V—V of FIG. 3. In the fuel element subassembly 40a, those fuel rods 76a disposed at the corners thereof and at the center of opposing sides of the subassembly 40a are secured directly to the end plates 78a by means of mounting screws 136, as described previously. The mounting screws 136 thus occupy similar positions as the mounting screws 98a of FIG. 3. The remainder of the mounting screws 98 are omitted and the longer fuel rods 134 are provided with modified end plugs 138, the outer ends of which are seated respectively in a plurality of recesses 140 formed in the adjacent side of the end plates 78a. In furtherance of this purpose, the outward ends of the end plugs 138 are reduced or necked down as denoted by the reference characters 142. Desirably, the shoulders 144 of the end plugs 138 are spaced a short distance from the adjacent surface of the end plates 78a to compensate for manufacturing tolerances and for differential thermal expansion. In other respects, the fuel element subassembly 40a is similar to that described hereintofore in connection with the subassembly 40.

In view of the foregoing, it will be apparent that novel and efficient forms of a fuel element assembly adapted for use with a neutronic reactor are disclosed herein. It is to be understood that the descriptive and illustrative materials employed herein are presented for the purposes of exemplifying the invention and are not to be interpreted as limitative thereof. Therefore, numerous modifications of the invention will occur to those skilled in the art without departing from the spirit and scope of the invention. Moreover, it is to be understood that certain features of the invention can be utilized without a corresponding use of other features.

Accordingly, what is claimed as new is:

1. In a fuel element assembly adapted for use in a neutronic reactor, the combination comprising a plurality of elongated fuel rods each containing a quantity of fissile material, said fuel rods being arranged into a lattice network, each row of fuel rods in one direction being secured to a strap member, a plurality of divider members inserted between adjacent rows of said lattice array at an angle to said strap members and to said one direction, and means for joining each of said divider members to all of said strap members.

2. In a fuel element assembly adapted for use in a neutronic reactor, the combination comprising a plurality of elongated fuel rods, each said fuel rod containing a quantity of fissile material, said fuel rods being arranged in a lattice array, alternate rows of said fuel rods in one direction being secured, respectively, to a first group of strap members, the remaining rows of said fuel rods in said direction being secured, respectively, to a second group of strap members, said second strap members being displaced along the length of said fuel rods from said first strap members, a plurality of divider members inserted between adjacent rows of said array at an angle to said strap members and to said direction, and means for joining each of said divider members to all of said first and said second strap members.

3. A fuel element assembly adapted for use in a neutronic reactor, said assembly comprising a plurality of elongated fuel rods each containing a quantity of fissile material, said fuel rods being arranged in a spaced lattice array, alternate rows of said fuel rods in one direction being joined, respectively, to a first group of strap members, the remainder of said rows in said direction being joined, respectively, to a second group of strap members, said second strap members being displaced longitudinally along the length of said fuel rods from said first strap members, a plurality of divider members inserted, respectively, between adjacent rows of said fuel rods at an angle to said strap members and to said direction, each of said divider members having first and second series of notches extending inwardly from its lateral edges, respectively, said first strap members being frictionally engaged in said first notches, respectively, of each divider member, and said second strap members being frictionally engaged in said second notches, respectively, of each said divider members.

4. In a fuel element assembly adapted for use in a neutronic reactor, the combination comprising a plurality of elongated fuel rods each containing a quantity of fissile material, said fuel rods being arranged in a spaced lattice array, alternate rows of said fuel rods in one direction being joined, respectively, to a first group of strap members, the remainder of said rows in said direction being joined, respectively, to a second group of strap members, said second strap members being displaced longitudinally along the length of said fuel rods from said first strap members, a plurality of divider members inserted, respectively, between adjacent rows of said fuel rods at an angle to said strap members and to said direction, each of said divider members having first and second series of notches extending inwardly from its lateral edges, respectively, said first strap members being frictionally engaged in said first notches, respectively, of each divider member, said second strap members being frictionally engaged in said second notches, respectively, of each said divider members, each of said first and second strap members being provided with complementary slots extending from an edge portion thereof and disposed for cooperative engagement with said first and said second notches respectively to prevent movement of said strap members laterally of said notches.

5. In a fuel element assembly adapted for use in a neutronic reactor, the combination comprising a plurality of elongated fuel rods, said fuel rods each containing a quantity of fissile material, said fuel rods being arranged into a lattice network, each of said rows of fuel rods in one direction being secured to a strap member, a plurality of divider members inserted between adjacent rows of said lattice array at an angle to said strap members and to said direction, means for joining each of said divider members to all of said strap members, some of said fuel rods being longer than the remainder of said fuel rods, and means for joining a pair of end plates to the respective ends of said longer fuel rods.

6. In a fuel element assembly adapted for use in a neutronic reactor, the combination including a plurality of subassemblies each comprising a plurality of elongated fuel rods having a quantity of fissile material, said fuel rods being disposed in a spaced lattice array, a plurality of strap members secured, respectively, to adjacent rows in one direction of said fuel rod array, a plurality of divider members inserted into said fuel rod array at an angle to said strap members, said divider members being disposed, respectively, between adjacent rows in another direction of said array, means for joining each of said divider members to all of said strap members, and some of said fuel rods in each subassembly being longer than the remainder of said fuel rods; and a pair of end plates joined, respectively, to the ends of said longer fuel rods of each said subassemblies, whereby said subassemblies are joined laterally together, each of said end plates having a plurality of flow apertures corresponding in number to that of said subassemblies and disposed, respectively, adjacent the ends of said subassemblies.

7. A fuel element assembly adapted for use in a neutronic reactor, said assembly including a plurality of subassemblies each comprising a plurality of elongated fuel rods having a quantity of fissile material, said fuel rods being disposed in a spaced lattice array, a plurality of strap members secured, respectively, to adjacent rows in one direction of said fuel rod array, a plurality of divider members inserted into said fuel rod array at an angle to said strap members, said divider members being disposed, respectively, between adjacent rows in another direction of said array, means for joining each of said divider members to all of said strap members, some of said fuel rods in each subassembly being longer than the remainder of said fuel rods, a pair of end plates joined, respectively, to the ends of said longer fuel rods of each said subassemblies whereby said subassemblies are joined laterally together, each of said end plates having a plurality of flow apertures corresponding in number to that of said subassemblies and disposed, respectively, adjacent the ends of said subassemblies and an end piece joined to the outer surface of each of said end plates including a plurality of strut members secured to said end plate at positions between adjacent pairs of said flow apertures, said strut members projecting generally outwardly of said end plates, the outward lateral edges of each of said strut members being disposed to fit relatively closely within an external conduit, and grappling means secured to the outer ends of said strut members.

References Cited in the file of this patent

UNITED STATES PATENTS

| | | |
|---|---|---|
| 1,869,236 | Baumann | July 26, 1932 |
| 1,946,234 | Price | Feb. 6, 1934 |
| 2,229,344 | Schneider | Jan. 21, 1941 |
| 2,838,452 | West et al. | June 10, 1958 |
| 2,841,545 | Zinn | July 1, 1958 |
| 2,861,035 | Zinn et al. | Nov. 18, 1958 |
| 2,879,216 | Hurwitz et al. | Mar. 24, 1959 |
| 2,905,338 | Koch | Sept. 22, 1959 |

OTHER REFERENCES

International Conference on Peaceful Uses of Atomic Energy, 1955, volume 3, pages 211–242.

Ger–1301, General Electric Publication, March 1957, presented at a joint session of the Nuclear Engineering and Power Divisions at the ASME Annual Meeting, November 26, 1956, in N.Y.C.